United States Patent
Wallace et al.

(10) Patent No.: US 10,387,632 B2
(45) Date of Patent: Aug. 20, 2019

(54) SYSTEM FOR PROVISIONING AND ALLOWING SECURE ACCESS TO A VIRTUAL CREDENTIAL

(71) Applicant: BANK OF AMERICA CORPORATION, Charlotte, NC (US)

(72) Inventors: Matthew Joseph Wallace, Media, PA (US); Kerry Michelle Cantley, Fort Mill, SC (US); Greg M. Correro, Oak Point, TX (US); Jeantou Alphonse DeGrammont, Decatur, GA (US); Michael Lee Funk, Hockessin, DE (US); Glenn Edward Hupfer, Highland Village, TX (US); Murali Sampath, Flower Mound, TX (US); Donna Lynne Shannon, Mesa, AZ (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 171 days.

(21) Appl. No.: 15/598,079

(22) Filed: May 17, 2017

(65) Prior Publication Data

US 2018/0336327 A1 Nov. 22, 2018

(51) Int. Cl.
*G06F 21/32* (2013.01)
*H04W 12/06* (2009.01)
(Continued)

(52) U.S. Cl.
CPC .............. *G06F 21/32* (2013.01); *G06F 21/36* (2013.01); *G06Q 20/351* (2013.01);
(Continued)

(58) Field of Classification Search
None
See application file for complete search history.

(56) References Cited

U.S. PATENT DOCUMENTS

| 4,720,860 A | 1/1988 | Weiss et al. |
| 4,800,590 A | 1/1989 | Vaughn et al. |

(Continued)

FOREIGN PATENT DOCUMENTS

| EP | 1338940 A1 | 8/2003 |
| EP | 1378870 A1 | 1/2004 |

(Continued)

OTHER PUBLICATIONS

Kossman; Activation sticker shock: New card may arrive already 'live'; 2016; Retrieved from the Internet <URL: https://www.creditcards.com/credit-card-news/card-activation-sticker-transactions.php>; pp. 1-5, as printed. (Year: 2016).*

(Continued)

*Primary Examiner* — Saleh Najjar
*Assistant Examiner* — Michael W Chao
(74) *Attorney, Agent, or Firm* — Michael A. Springs; Moore & Van Allen PLLC; Jeffrey R. Gray (57) ABSTRACT

Systems, computer products, and methods are described herein for improved authentication utilizing two factor authentication of a user. The two factors include a verified identification and a liveness identification. The verified identification may be a governmental verified identification, and the liveness identification may be a video of the user. The user may capture the verified identification and the liveness identification using the user's mobile device. The organization may authenticate the user by identifying the user from the verified identification image and identifying that the user is active by identifying movement from the liveness identification image. Additional authentication may include requiring and/or identifying an identifier from the liveness identification image (e.g., movement, object, characters, or the like), and/or capture image data related to a time or a location at which the images were captured.

20 Claims, 4 Drawing Sheets

(51) Int. Cl.
*H04L 29/06* (2006.01)
*G06Q 20/34* (2012.01)
*G06F 21/36* (2013.01)

(52) U.S. Cl.
CPC ......... *H04L 63/0861* (2013.01); *H04W 12/06* (2013.01); *G06F 2221/2115* (2013.01); *G06F 2221/2133* (2013.01); *H04L 2463/082* (2013.01)

(56) References Cited

U.S. PATENT DOCUMENTS

| | | | |
|---|---|---|---|
| 4,819,267 | A | 4/1989 | Cargile et al. |
| 5,060,263 | A | 10/1991 | Bosen et al. |
| 5,168,520 | A | 12/1992 | Weiss et al. |
| 5,182,767 | A | 1/1993 | Bernard |
| 5,216,716 | A | 6/1993 | Bernard |
| 5,361,062 | A | 11/1994 | Weiss et al. |
| 5,432,851 | A | 7/1995 | Scheidt et al. |
| 5,577,121 | A | 11/1996 | Davis et al. |
| 5,592,553 | A | 1/1997 | Guski et al. |
| 5,627,355 | A | 5/1997 | Rahman et al. |
| 5,638,444 | A | 6/1997 | Chou et al. |
| 5,657,388 | A | 8/1997 | Weiss |
| 5,661,807 | A | 8/1997 | Guski et al. |
| 5,859,913 | A | 1/1999 | Goreta et al. |
| 5,887,065 | A | 3/1999 | Audebert et al. |
| 5,936,220 | A | 8/1999 | Hoshino et al. |
| 5,937,068 | A | 8/1999 | Audebert et al. |
| 5,963,643 | A | 10/1999 | Goreta et al. |
| 6,012,636 | A | 1/2000 | Smith et al. |
| 6,067,621 | A | 5/2000 | Yu et al. |
| 6,163,771 | A | 12/2000 | Walker et al. |
| 6,445,780 | B1 | 9/2002 | Rosset et al. |
| 6,609,654 | B1 | 8/2003 | Anderson et al. |
| 6,628,198 | B2 | 9/2003 | Fieschi et al. |
| 6,641,050 | B2 | 11/2003 | Kelley et al. |
| 6,704,715 | B1 | 3/2004 | Rosset et al. |
| 6,715,082 | B1 | 3/2004 | Chang et al. |
| 6,902,116 | B2 | 6/2005 | Finkelstein |
| 6,928,558 | B1 | 8/2005 | Allahwerdi et al. |
| 6,952,781 | B1 | 10/2005 | Chang et al. |
| 6,957,185 | B1 | 10/2005 | Labaton |
| 7,003,501 | B2 | 2/2006 | Ostroff |
| 7,051,929 | B2 | 5/2006 | Li |
| 7,308,581 | B1* | 12/2007 | Geosimonian .......... G06F 21/32 713/182 |
| 7,922,082 | B2 | 4/2011 | Muscato |
| 8,201,747 | B2 | 6/2012 | Brown et al. |
| 8,442,824 | B2* | 5/2013 | Aley-Raz ................ G10L 17/24 704/247 |
| 8,457,367 | B1 | 6/2013 | Sipe et al. |
| 8,567,670 | B2 | 10/2013 | Stanfield et al. |
| 8,615,468 | B2 | 12/2013 | Varadarajan |
| 8,919,643 | B2 | 12/2014 | Ashfield |
| 8,984,622 | B1 | 3/2015 | Baldwin et al. |
| 9,251,637 | B2 | 2/2016 | Ashfield |
| 9,311,464 | B2 | 4/2016 | Stuntebeck et al. |
| 9,408,076 | B2 | 8/2016 | Chen et al. |
| 9,477,959 | B2 | 10/2016 | Ashfield |
| 9,501,774 | B2 | 11/2016 | Ashfield |
| 10,042,993 | B2* | 8/2018 | Beigi ...................... G06F 21/32 |
| 2001/0054148 | A1 | 12/2001 | Hoornaert et al. |
| 2001/0056409 | A1 | 12/2001 | Bellovin et al. |
| 2002/0116617 | A1 | 8/2002 | Talton, Sr. |
| 2002/0133713 | A1 | 9/2002 | Fieschi et al. |
| 2002/0198848 | A1 | 12/2002 | Michener |
| 2003/0011731 | A1 | 1/2003 | Yoshida et al. |
| 2003/0046551 | A1 | 3/2003 | Brennan |
| 2003/0084304 | A1 | 5/2003 | Hon et al. |
| 2003/0126094 | A1 | 7/2003 | Fisher et al. |
| 2003/0135739 | A1 | 7/2003 | Talton, Sr. |
| 2003/0182241 | A1 | 9/2003 | Everhart |
| 2003/0204732 | A1 | 10/2003 | Audebert et al. |
| 2003/0208449 | A1 | 11/2003 | Diao |
| 2003/0212894 | A1 | 11/2003 | Buck et al. |
| 2004/0026495 | A1 | 2/2004 | Finkelstein |
| 2004/0026506 | A1 | 2/2004 | Finkelstein |
| 2004/0031856 | A1 | 2/2004 | Atsmon et al. |
| 2004/0059952 | A1 | 3/2004 | Newport et al. |
| 2004/0064706 | A1 | 4/2004 | Lin et al. |
| 2004/0202325 | A1 | 10/2004 | Margalit et al. |
| 2004/0255119 | A1 | 12/2004 | Ukeda et al. |
| 2005/0015588 | A1 | 1/2005 | Lin et al. |
| 2005/0043997 | A1 | 2/2005 | Sahota et al. |
| 2005/0050330 | A1 | 3/2005 | Agam et al. |
| 2005/0067485 | A1 | 3/2005 | Caron |
| 2005/0069137 | A1 | 3/2005 | Landrock |
| 2005/0166263 | A1 | 7/2005 | Nanopoulos et al. |
| 2005/0182927 | A1 | 8/2005 | Shatford |
| 2005/0182971 | A1 | 8/2005 | Ong et al. |
| 2005/0188202 | A1 | 8/2005 | Popp |
| 2005/0239440 | A1 | 10/2005 | Chen et al. |
| 2005/0240528 | A1 | 10/2005 | Hendrick |
| 2005/0269402 | A1 | 12/2005 | Spitzer et al. |
| 2006/0015358 | A1 | 1/2006 | Chua |
| 2006/0059346 | A1 | 3/2006 | Sherman et al. |
| 2006/0174113 | A1 | 8/2006 | Zahari |
| 2006/0242698 | A1 | 10/2006 | Inskeep et al. |
| 2007/0136211 | A1 | 6/2007 | Brown et al. |
| 2008/0029607 | A1 | 2/2008 | Mullen |
| 2008/0137861 | A1 | 6/2008 | Lindmo et al. |
| 2010/0076833 | A1* | 3/2010 | Nelsen ................... G06Q 20/06 705/14.25 |
| 2012/0290449 | A1* | 11/2012 | Mullen .................. G06Q 10/00 705/27.2 |
| 2012/0310826 | A1* | 12/2012 | Chatterjee ............. G06Q 20/36 705/41 |
| 2013/0036462 | A1* | 2/2013 | Krishnamurthi ........ G06F 21/32 726/19 |
| 2014/0249904 | A1* | 9/2014 | Nelsen ................. G06Q 20/351 705/14.23 |
| 2014/0359722 | A1* | 12/2014 | Schultz ............... H04L 63/0861 726/5 |
| 2015/0088753 | A1* | 3/2015 | Van Der Schueren ..................... G06Q 20/351 705/67 |
| 2015/0347734 | A1* | 12/2015 | Beigi ...................... G06F 21/32 713/155 |
| 2016/0335483 | A1* | 11/2016 | Pfursich ............. G06K 9/00899 |
| 2017/0019400 | A1* | 1/2017 | Drolshagen ........ H04L 63/0861 |
| 2017/0318019 | A1* | 11/2017 | Gordon .............. G06K 9/00617 |
| 2018/0122167 | A1* | 5/2018 | Maggioni ........... G07C 9/00087 |
| 2018/0239955 | A1* | 8/2018 | Rodriguez ........... G06K 9/0061 |
| 2018/0260617 | A1* | 9/2018 | Jones ................. G06K 9/00288 |
| 2019/0013026 | A1* | 1/2019 | Feng ...................... G10L 25/51 |

FOREIGN PATENT DOCUMENTS

| | | |
|---|---|---|
| GB | 2387999 A | 10/2003 |
| WO | 0163515 A1 | 8/2001 |
| WO | 01/67355 A2 | 9/2001 |
| WO | 0048064 A9 | 9/2001 |

OTHER PUBLICATIONS

On-Line E-Wallet System with Decentralized Credential Keepers. Mobile Networks and Applications 8 [online]. The Netherlands: The Kluwer Academic Publishers, 2003 [retrieved on Apr. 27, 2008]. pp. 87-99.
International Preliminary Report on Patentability for International Patent Application No. PCT/US2006/015218 dated Jul. 3, 2007.
Canadian Office Action issued in 2,605,596 dated May 29, 2013.
Pocket device for authentication and data integrity on Internet banking applications. IEEE 0-7802/03 [online], [retrieved on Apr. 25, 2008]. pp. 43-50.
Korean Office Action for KR Application No. 10-2007-7027029 dated Jul. 18, 2012.
Chinese Patent Office; Second Office Action; dated Jul. 12, 2010; issued in Chinese Patent Application No. 200680022761.0.
European Patent Office, Examination Report for European Patent (56) References Cited

OTHER PUBLICATIONS

Application No. 06758494.6 dated Apr. 29, 2010, 5 pgs.
European Patent Office, Examination Report, dated Mar. 4, 2008, issued in European Patent Application No. 06758494.6.
Mexican Patent Office, Office Action, dated May 4, 2010, issued in Mexican Patent Application No. MX/a/2007/013218.
Chinese Patent Office; First Office Action; dated Nov. 6, 2008; issued in Chinese Patent Application No. 200680022761.0.
International Search Report and Written Opinion for International Patent Application No. PCT/US2006/015218 dated Aug. 22, 2006.
International Search Report and Written Opinion for International Patent Application No. PCT/US2007/084529 dated Jun. 4, 2008.
International Preliminary Report on Patentability and Written Opinion for International Application No. PCT/US2007/084529 dated May 28, 2009.
Database Inspec [Online], The Institution of Electrical Engineers, Steveange, GB; Feb. 14, 2007, (Feb. 14, 2007) Molloy I et al.: "Dynamic Virtual Credit Card Numbers", XP002480816, Database accession No. 9721118.
Extended search report issued by the European Patent Office for related European Patent Application No. 10012051.8 dated May 24, 2011.

\* cited by examiner

FIG. 1

SYSTEM FOR PROVISIONING AND ALLOWING SECURE ACCESS TO A VIRTUAL CREDENTIAL

FIELD

The present invention relates to authentication of a user, and more particularly using multiple factors to authenticate the user including captured video of the user.

BACKGROUND

Authenticating a user is increasingly difficult, especially in view of the fact that interactions between users and/or entities are more frequently occurring apart from one another over the Internet and less frequently face-to-face. Moreover, due to the increase in the frequency of electronic interactions between users and/or entities all types of interactions (e.g., over the Internet and/or face-to-face) are subject to potential security issues. As such, improved authentication systems are needed to provide more accurate authentication of users.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for improved authentication utilizing two factor authentication of a user. The two factors may include a verified identification and a liveness identification. The verified identification, as will be described in further detail herein, may be a governmental verified identification, such as a driver's license, passport, military identification, other governmental identification, and the liveness identification may include a still image of the user, a string of multiple images, a live or moving image of the user, a video of the user, or other like image. The user may capture the verified identification and the liveness identification using the user computer system (e.g., user's mobile device, or the like). The organization may authenticate the user by identifying the user from the verified identification image and identifying that the user is active (e.g., by identifying movement of the user from the liveness identification image). Additional authentication may include requiring and/or identifying an identifier from the liveness identification image, such as but not limited to a specific movement made by the user in a video, characters, keywords, or phrases written or spoken in a photo or video, objects included in a photo or video, or the like that can be identified in the image. The organization may also analyze captured image data to provide additional authentication. The captured image data may include, for example, the time and location at which the images of the verified identification and liveness identification were captured, and such captured image data may be compared to authentication requirements in order to determine that the images were actually captured by the user.

As will be discussed in further detail herein, the present invention may be utilized to increase the speed at which the user system and organization system can authenticate the user because the organization may authenticate the user in real-time, when requested, since such authentication can be determined through the use of images instead of a detailed investigation of the user. Moreover, the security of authentication is improved by using image capture information from the mobile device of the user in real-time. The images provide actual evidence from the user of not only a verified identification, but an up to date liveness identification of the user. Additional levels of security may be added by requiring authentication requirements for the image and/or captured image data for the images, which further improves the security of authentication. Additionally, the present invention allows the user to take actions immediately using a mobile device once authenticated. The authentication provided herein solves at least the technical problem of authenticating a user across an interaction over the Internet, in which the organization may question the actual identity of the user.

Embodiments of the invention comprise system, computer implemented methods, and computer program products for a system for authentication using a live user determination. The invention comprises receiving a request from a user through a user application to access an organization application to take an action, wherein the user application is located on a mobile device of the user and the request is received from the mobile device. The invention further comprises receiving a verified identification image and a liveness identification image, wherein the verified identification image and the liveness identification image are captured by the user through the mobile device and received from the mobile device. The liveness identification image is a video of the user. The invention further comprises determining that the user is authenticated for the action based on the action, the verified identification image, and the liveness identification image.

In further accord with embodiments of the invention, the verified identification image is an image of a government issued identification that verifies an identity of the user, and the video of the user verifies that the user is active.

In other embodiments of the invention, determining that the user is authenticated comprises capturing first user information from the verified identification image, wherein the first user information comprises at least a name of the user from the government issued identification and an indication of an identifier. Determining that the user is authenticated further comprises capturing the identifier from the liveness identification image, wherein the identifier comprises a movement of the user indicating that the user is active, an object in the video other than the user, or facial recognition information.

In still other embodiments of the invention, determining that the user is authenticated comprises capturing first user information from the verified identification image, and capturing second user information from the liveness identification image. The first user information and the second user information are images of the user's face. Determining that that the user is authenticated further comprises comparing the first user information and the second user information for the authentication of the user.

In yet other embodiments of the invention, determining the authentication of the user comprises identifying electronic capture data from the verified identification image and from the liveness verified identification image, wherein the electronic capture data is captured by the user using the mobile device, and wherein the electronic capture data is coupled to the verification identification image and the liveness identification image. Determining the authentication of the user further comprises comparing the electronic capture data of the verified identification image and the liveness verified identification image with authentication requirements.

In further accord with embodiments of the invention, the electronic capture data comprises a time when the verified identification image and the liveness identification image were captured by the mobile device, wherein the authentication requirements include a required time period, and wherein the authentication requirements are met when the verified identification image and the liveness identification image are both captured at the time that falls within the required time period.

In other embodiments of the invention, the electronic capture data comprises a location where the verified identification image and the liveness identification image were captured using a location determining device of the mobile device, wherein the authentication requirements include a required location, and wherein the authentication requirements are met when the location where the verified identification image or the liveness identification image were captured meet the required location.

In still other embodiments of the invention, after determining the authentication of the user the invention comprises receiving an indication from the user of an authentication identifier in the video that may be used for future authentication. The invention further comprises storing the authentication identifier for the user for the future authentication. Determining the authentication of the user further comprises receiving a request from the user for a second action, and receiving a second video from the user. Thereafter a determination of a current identifier of the user from the second video is made, and a second authentication of the user is determined based on the current identifier matching the authentication identifier.

In yet other embodiments of the invention, the authentication identifier and the current identifier comprise a movement of the user in the video and the second video.

In further accord with embodiments of the invention, the action is a request to open a resource pool to access resources, and wherein the request includes user information regarding the request.

In other embodiments, the invention further comprises allowing virtual access to the resources through the mobile device when the authentication of the user and the request for access to the resource pool are approved. The invention further comprises allowing the user to utilize the resources through the mobile device while the user waits for physical access to the resources.

In still other embodiments, the invention further comprises receiving an indication that that the user has the physical access to the resources in the resource pool. The invention further comprises allowing the user to retain the virtual access to the resources in the resource pool through the mobile device when an indication that the user wants to retain the virtual access to the resources in the resource pool is received from the user through the mobile device. The claims further comprise removing reference to the resources from the mobile device of the user when an indication that the user wants to remove the virtual access to the resources in the resource pool is received from the user through the mobile device.

In yet other embodiments of the invention, the virtual access is provided through the use of a virtual card.

In further accord with embodiments of the invention, the physical access is provided through the use of a physical card.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, and wherein:

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that provide for improving confidence in the authentication of a user, security associated with identifying the user for authentication, and preventing the misappropriation of user information and resources. Moreover, the systems, methods, and computer program products provide authentication that may be captured, duplicated, and used in the future for ongoing authentication that is more secure and more timely than traditional authentication. It should be understood that the embodiments of the invention disclosed herein provide a number of different ways to improve the security and confidence associated with the authentication of a user, and in particular authentication of a user related to interactions that occur over the Internet. The present invention solve at least the technical problem of identifying a user over the Internet.

Figure 1:
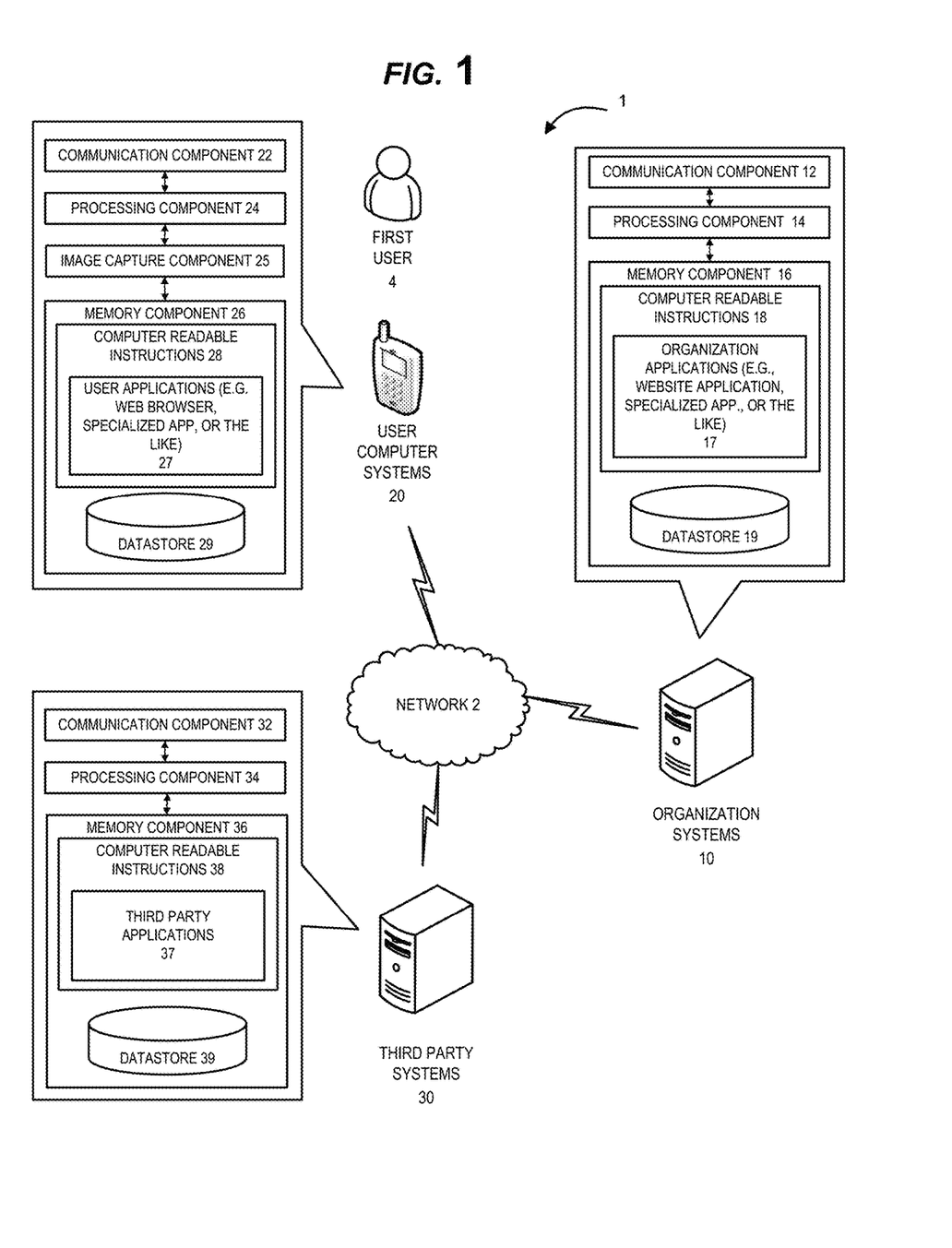
FIG. 1 illustrates a block diagram of an authentication system environment, in accordance with embodiments of the invention.

FIG. 1 illustrates an authentication system environment 1, in accordance with embodiments of the invention. As illustrated in FIG. 1, one or more organization systems 10 are operatively coupled, via a network 2, to one or more user computer systems 20, one or more third-party systems 30, and/or one or more other systems (not illustrated). In this way, the user 4 (e.g., one or more associates, employees, agents, contractors, sub-contractors, third-party representatives, customers, or the like), through a user application 27 (e.g., web browser, dedicated or specialized application, or the like), may access an organization application 17 (e.g., website, dedicated or specialized application, or the like) of the organization systems 10, and the organization may utilize two or more factors for authentication of the user 4. The two or more factors may include a verified identification image (e.g., a driver's license, passport, military identification, other governmental identification, or other verified identification for the user which the user captures as a photo or in a video) and a liveness identification image (e.g., a still photo of the user, a string of multiple photos, a live or moving photo of the user, video of the user, or other like photo or video). In some instances the verified identification image and/or the liveness identification may include a reference to an identifier and/or may include the identifier. The identifiers may include, but are not limited to movements, characters, keywords, phrases, objects, or the like. Moreover, the verified identification image and/or the liveness identification image may be associated with captured image data, such as a time and location at which the images were captured. The systems described herein may use the images, identifiers, and/or captured image data to provide improved authentication of the user. The improved authentication of the user 4 allows the organization application 17 and/or a third-party application 37 to interact with the user through the user application 27 with improved confidence of the identity of the user 4.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the third-party systems 30, or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the organization systems 10 comprise computer-readable instructions 18 stored in the memory component 16, which in one embodiment includes the computer-readable instructions 18 of the organization application 17 (e.g., secure website application, secure dedicated application, or the like). In some embodiments, the one or more memory components 16 include one or more data stores 19 for storing data related to the organization systems 10, including, but not limited to, data created, accessed, and/or used by the organization application 17. The organization application 17 may be validating the user 4 for the organization or for a third-party, and the organization application 17 may require the two or more factors for authentication of the user 4, including the verified identification and the liveness identification described herein.

As illustrated in FIG. 1, users 4 may access the organization application 17, or other applications, through a user computer system 20. The user computer system 20 may be a desktop, mobile device (e.g., laptop, smartphone device, PDA, tablet, or other mobile device), or any other type of computer that generally comprises one or more communication components 22, one or more processing components 24, and one or more memory components 26.

The one or more processing components 24 are operatively coupled to the one or more communication components 22, the one or more image capture components 25, and the one or more memory components 26. The one or more processing components 24 use the one or more communication components 22 to communicate with the network 2 and other components on the network 2, such as, but not limited to, the organization systems 10, the third-party systems 30, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touchscreen, touchpad, microphone, mouse, joystick, other pointer component, button, soft key, and/or other input/output component(s) for communicating with the users 4.

The one or more processing components 24 use the one or more image capture components 25 to capture images. The one or more image capture components 25 may include one or more cameras, or other image capture devices, that allow the user 4 to capture images as will be described herein in further detail.

As illustrated in FIG. 1, the user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other apps that allow the user 4 to take various actions, including allowing the user 4 to access applications located on other systems, or the like. In some embodiments, the user 4 utilizes the user computer systems 20 (e.g., image capture component 25, and the like) to capture the verified identification image and the liveness identification image, and further uses the user application 27 to transmit the captured images to the organization application 17.

As illustrated in FIG. 1, one or more third-party systems 30 may communicate with the organization systems 10 and/or user computer systems 20 to engage in interactions with the user 4. As such, the third-party systems 30 are operatively coupled, via a network 2, to the one or more organization systems 10, the user computer systems 20, and/or other systems. The third-party systems 30 generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of organization systems 10, the user computer systems 20, and/or other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the third-party systems 30 may have computer-readable instructions 38 stored in the one or more memory components 36, which in one embodiment includes the computer-readable instructions 38 of third-party applications 37 that allow for the interactions with the user 4 and/or organization, as will be described herein. The third-party and third-party systems 30 may act for the user 4 and/or organization systems 10, and thus may act as an intermediary between the user 4 and the organization systems 10. Alternatively, the third-party or third-party systems 30 may interact with the user 4 or organization in separate interactions outside of the interactions between the user 4 and the organization.

Moreover, as illustrated in FIG. 1, other like systems may be are operatively coupled to the organization systems 10, the user computer systems 20, and/or the third-party systems 30, through the network 2. The other like systems have components the same as or similar to the components described with respect to the organization systems 10, the user computer systems 20, and/or the third-party systems 30 (e.g., one or more communication components, one or more processing components, and one or more memory devices with computer-readable instructions of one or more applications, one or more datastores, or the like). Thus, the other like systems communicate with the organization systems 10, the user computer systems 20, the third-party systems 30, and/or each other in same or similar way as previously described with respect to the organization systems 10, the user computer systems 20, and/or the third-party systems 30.

Figure 2:
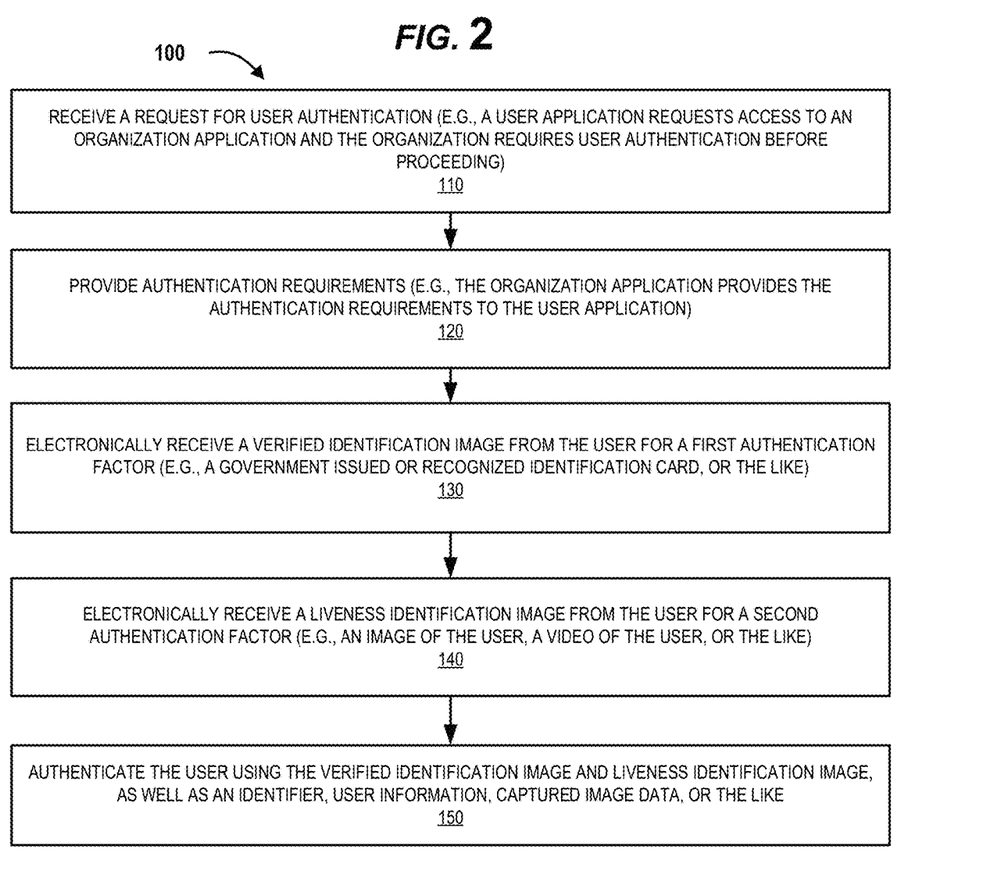
FIG. 2 illustrates a high level process flow for two factor authentication of a user using a verified identification form and a liveness identification form, in accordance with embodiments of the invention.

FIG. 2 illustrates a high level process flow for two factor authentication of a user using a verified identification form and a liveness identification form. As illustrated in block 110 of FIG. 2 a request is received for authenticating the user 4. The request may be sent by the user 4 through the user application 27 using the user computer systems 20, and received by the organization application 17, through the organization systems 10 (in some embodiments the request may be sent or received through one or more third-party systems 30). Block 120 of FIG. 2 illustrates that the authentication requirements are presented to the user. For example, the organization application 17, through the organization systems 10, may provide authentication requirements to the user 4 through the user application 27 on the user computer system 20. The authentication requirements may include information regarding the requirements for the verified identification and/or the liveness identification, as well as other required information needed for authentication. For example, the authentication requirements may include a verified identification requirement, such as the type of verified identification (e.g., driver's license, military identification, business identification, or other like verified identification type), the issue date of the verified identification falling within a specific time frame, the verified identification has not expired, the verified identification includes a photograph of the user, the government entity that issued the verified identification, the location at which the image of the verified identification is captured, the time when the image of the verification identification is captured, or other like verified identification requirement. Moreover, the authentication requirements may further include liveness identification requirements, such as the type of image captured (e.g., photo, live photo, video, or the like), size of the user's face in the image, location at which the image is captured, time at which the image is captured, length of a video, or the like. Moreover, the authentication requirements may further include an identifier or reference to an identifier to include in the image of the verification identification and/or the liveness identification. For example, the identifier requirement may request the user 4 to include in one or more of the images a dated publication, specific landmark, specific movement, keywords, characters, phrases, or the like spoken or written, object, or other like identifier.

Block 130 of FIG. 2 illustrates that the verified identification image for the user 4 is received as the first authentication factor. For example, the verified identification image for the user 4 is electronically received by the organization application 17, through the organization systems 10, from the user application 27, through the user computer systems 20. In some embodiments, the user 4 captures an image of the verified identification (e.g., image of the user's driver's license, or the like) using the image capture component 25 of the user computer system 20, and the user 4 sends the verified identification image to the organization application 17 as the first authentication factor. As will be described in further detail later, image capture data may also be captured when the user captures the verified identification image. The image capture data may include a time stamp indicating the time at which the image was captured and/or a location at which the image was captured. The time stamp may be captured using the application that is used to capture the image or another application, and the location data may be captured using an application associated with the location determination component (e.g., GPS device, near field communication device, wireless communication device, or the like), or another application. The image capture data may be coupled (e.g., embedded within, attached to, referenced by, or the like) to the captured images and transferred to the organization along with the images.

FIG. 2 further illustrates in block 140, that the liveness identification image for the user is received as the second authentication factor. For example, the liveness identification image for the user 4 is electronically received by the organization application 17, through the organization systems 10, from the user application 27, through the user computer systems 20. In some embodiments, the user 4 captures an image (e.g., a photo, a live photo, a video, or the like) of the user 4 and sends the image (e.g., a photo, a live photo, a video, or the like) to the organization application 17 as a second authentication factor. As will be described in further detail later, the image may include an identifier in order to meet the authentication requirements. Moreover, as previously discussed with respect to block 130, image capture data (e.g., a time stamp, a location, or the like) may also be captured when the user captures the liveness identification image, and coupled to the liveness identification image.

Block 150 illustrates that the user 4 is authenticated, utilizing at least in part the verified identification image and the liveness identification image, an identifier, the captured data, and/or user information identified from the images, as will be discussed in different embodiments in further detail throughout. For example, in some embodiments the verified identification image (e.g., image of the user's drivers license, or the like) is used to authenticate the user's identity. User information may be identified from the verified identification image, such as by analyzing the image (e.g., scanning the image for characters, or the like) in order to determine the user's name, address, identification number, face from a photo of the user in the image, authority that issued the identification, issue date of the identification, expiration date of the identification, or the like from the verified identification image. The liveness identification image may be used to identify that the user 4 that sent and/or is in the verified identification image is the same as in the liveness identification image, and that the user 4 in the liveness identification image is active (e.g., alive, the person sending the images, the person requesting authentication, or the like). Like with the verified identification image, user information may be identified from the liveness identification image, such as by analyzing the image (e.g., by scanning the image, scanning the video, or the like) in order to determine that the user 4 is in the image (e.g., from facial recognition, or the like). The user information from the verification identification image and/or the liveness identification image may be compared to other user information that the organization has or to each other in order to authenticate the user 4. In addition to the user information in the images, identifiers may be captured from the verified identification image and/or the liveness identification image. For example, the liveness identification image may include an identifier that may include, but is not limited to movements, characters, keywords, phrases, numbers, objects, or the like that can be captured from the image (e.g., from the video). The identifiers in the images may be used to provide further security by requiring and/or identifying the identifiers in the images. Image capture data may also be used to provide additional security to the authentication process. For example, the time and location of the captured of the verified identification image and the liveness identification image may be captured by the user computer system 20 and coupled to the images. In other examples, a reference to the user's mobile device that captured and/or sent the images may be captured as captured image data and coupled to the images. As such, the organization can identify from the images the time and location at which each were captured, as well as the mobile phone that captured and/or sent the images (e.g., and compare the reference to the mobile phone to a mobile phone reference stored by the organization), in order to make sure the images were actually taken and/or sent by the user 4 and not simply captured from other sources and provided to the organization. Other captured image data may also be used such as but not limited to picture quality, pixels, image sizes, or the like.

The organization may use one or more of these features in order to provide authentication of the user, including using different combinations of features in order to provide different levels of authentication. For example, different levels of authentication may be provided based on how confident the organization is that the user 4 is who the user 4 claims to be based on the number of authentication features used.

It should be understood that while blocks 110 through 150 are described as being performed between a user 4 and an organization, it should be understood that the interaction between the user 4 and organization described with respect to FIG. 2 (or with respect to FIGS. 3 and 4 below) may further include or may alternatively include an interaction with a third-party through a third-party application 37, through third-party systems 30.

Figure 3:
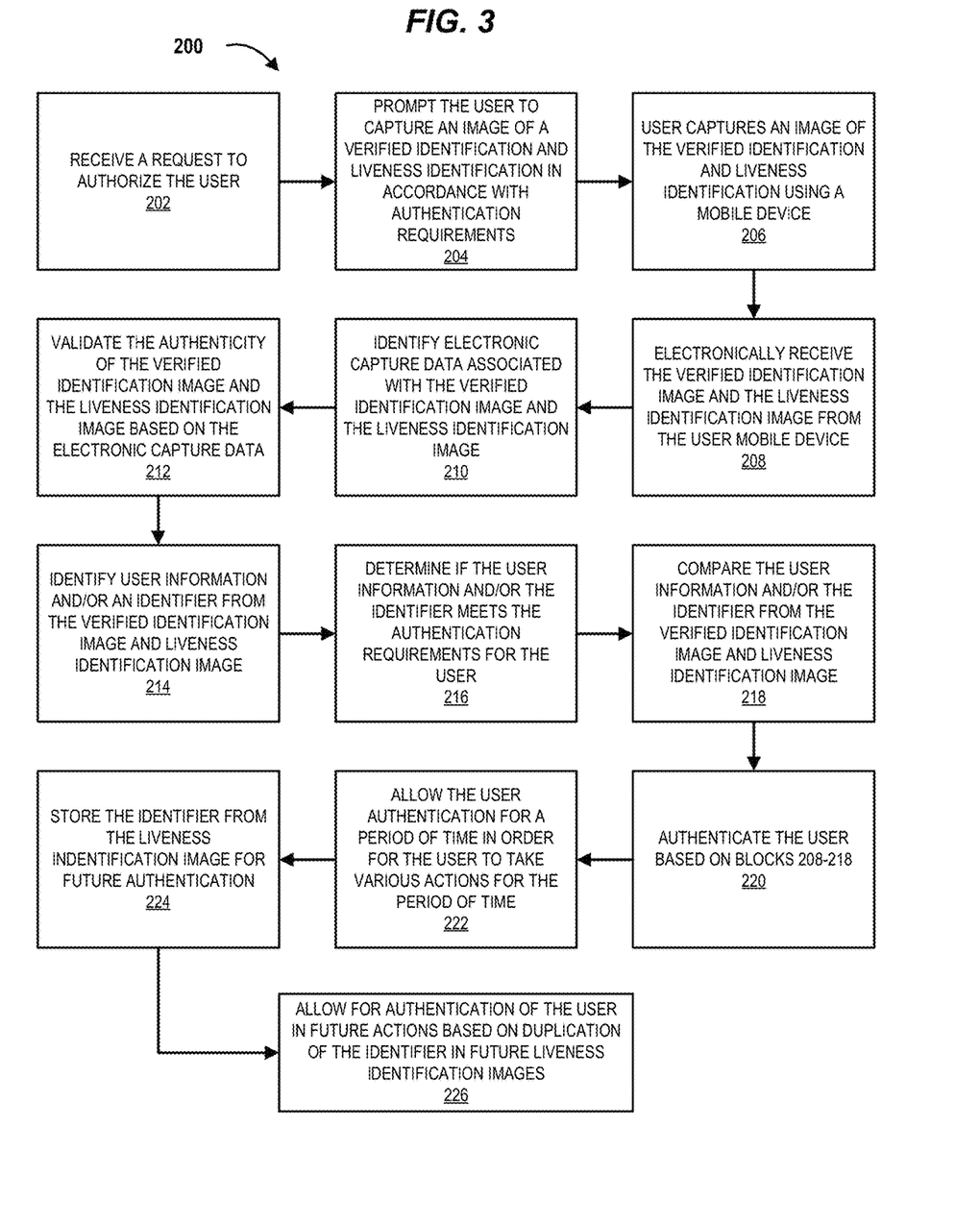
FIG. 3 illustrates a process flow for authenticating a user based on two images captured by the user computer system and user information and captured image data associated with the two images, in accordance with embodiments of the invention.

FIG. 3 illustrates a process flow for authenticating a user based on at least two authentication factors captured by the user's mobile device. As illustrated by block 202 a request is received to authenticate a user (e.g., as previously discussed with respect block 110 in FIG. 2). For example, a user 4 may request to take an action through the use of the user's mobile device (e.g., the user computer system 20). The organization may receive the request to authorize the user 4 through communication of the organization application 17 on the organization systems 10 with the user application 27 on the user computer systems 20.

In response to receiving the request from the user 4, the organization system 10 may provide the requirements needed for authentication. For example, as illustrated by block 204 in FIG. 3, the organization may prompt the user 4 to capture an image of a verified identification of the user 4, as well as an image of the liveness identification of the user, such as a video or live photo of the user 4. In some embodiments, the organization may also prompt the user 4 to meet authentication requirements associated with the verified identification and the liveness identification, as previously described generally with respect to FIG. 2. The requirements, may include the type of verified identification as well as specifically capturing a video for the liveness identification. Moreover, as previously discussed the authentication requirements may further include requiring an identifier in the verified identification image and/or the liveness identification image.

In addition to the specific authentication requirements related to the capture of the identification images, the authentication requirements may also require captured image data associated with the identification images captured. For example, to improve authentication of the user, the organization may require that the user allow for time stamps and locations stamps for the captured identification images. As such, when the user 4 captures an image of the verification identification and liveness identification, captured image data may be associated with the images, such as the time the image was captured and the location at which the images were taken (e.g., through the use of a location determining component of the user computer system 20). In this way the organization application 17 may not allow the receipt of images if they do not include a time stamp and/or a location stamp. In some embodiments, the organization application 17 and organization system 10 may force a change in the setting of a user's mobile phone (e.g., with the permission of the user 4) to allow for time stamp and/or location stamps when the user captures the images (e.g., temporally changing the settings in the user's mobile device). For example, in some embodiments the organization application 17 may not allow the user 4 to upload images that do not have time stamps and/or location stamps (or images that dot not meet a particular time stamp or location stamp), and the organization application 17 may further request access to the user's mobile device to change time stamp and/or location stamp settings, and thereafter, make the setting changes when allowed by the user 4.

Moreover, the organization may require that one of the images are taken first. For example, the organization may require that the verified identification image is captured before the liveness identification image is captured (or vice versa). In some embodiments the organization may also require that the images are taken within a pre-determined time period, and/or the images are taken at a particular time (e.g., time of day) and location (e.g., at the user's home, work, or other location at which only the user has access). The time and location requirements, as well as other electronic capture data requirements may be presented to the user 4 on the user's mobile device.

It should be understood that the authentication requirements may be determined unilaterally by the organization and/or as previously agreed to between the organization and the user 4. Moreover, some of the authentication requirements may be standard (e.g., verified identification type, a video for the liveness identification image, or the like), while other authentication requirements may change over time (e.g., a required spoken word or phrase in the video, gesture movement in the video, characters included in an image, or the like). In some embodiments, the organization may select the number and type of authentication requirements at random or specifically based on the type of request made by the user 4 (e.g., based on different levels of authentication. For example, more authentication requirements may be required when the interaction is related to the user 4 accessing sensitive information of the organization.

Block 206 of FIG. 3 illustrates that the user 4 captures an image of the user's verified identification using an image captured device 25 (e.g., camera, or the like) on the user's mobile device. For example, the user's verified identification may be the user's driver's license. The user 4 also captures an image of the user's liveness identification using a camera on the user's mobile device. For example, the user's liveness identification may be a video (or live image) of the user using a camera in the user's mobile device. The captured image data associated with the images may be attached to the images captured, or otherwise stored and associated with the images for future transfer to the organization. For example, the electronic captured image data may be associated with the image through a user image capture application, the user application 27, the organization application 17 through which the user is requesting access (e.g., authentication), or the like.

As illustrated in block 208 of FIG. 3, the images of the verified identification and liveness identification are transferred to the organization. As previously discussed with respect to block 130 and 140 in FIG. 2, the organization application 17, through the organization systems 10, receives the images of the identification from the user application 27, through the mobile device of the user 4. The electronic captured image data embedded in the images, referenced to in the images, attached to the images, or coupled to the images in another way, is also transferred to the organization.

Block 210 further illustrates that the organization may identify the electronic captured image data coupled to the images received (e.g., the verified identification image and the liveness identification image). For example, the organization may identify the time stamp coupled with both the verified identification image and liveness identification image to determine when the images were taken, and may identify the location stamp coupled with both the verified identification image and liveness identification image to determine where the images were captured.

As illustrated by block 212 in FIG. 3 the organization may validate the authenticity of the images received (e.g., the verified identification image and the liveness identification image) based at least on the electronic captured image data from the images, as described with respect to block 206 and 208. For example, if the electronic captured image data does not meet the capture image data authentication requirements, then the organization may not authenticate the user regardless of whether or not the verification identification image and liveness identification satisfy other requirements. In some embodiments the organization may determine if the image of the verification identification and liveness identification meet the time requirements. For example, the organization may determine that the verification identification image and the liveness identification image were taken by the user 4 after the user has requested authentication from the organization (e.g., the images were not taken prior to the time of requesting authentication). In other examples, the organization may determine that the verification identification image and the liveness identification image were each taken within an individual time period (e.g., within the last 15 mins, 30 mins, 1 hr., 12 hours, 24 hrs. or the like) and/or were both taken within an associated time period (e.g., within 1 min, 5 mins, 10 mins, 30 mins, 1 hr., or the like of each other). By meeting the time requirements the organization may have more confidence that the images were in fact taken by the user 4 and not an actor trying to misappropriate the identity of the user 4.

In addition to the time requirements, or alternative to the time requirements, in some embodiments, the organization may determine that the verification identification image and liveness identification image meet location authentication requirements. For example, the organization may determine where the verification identification image and liveness identification image were captured from the electronic captured image data and compare the captured locations with the location authentication requirements. For example, the organization may determine that both images were taken in the same location. In other examples the organization may determine that at least one of the images were captured at a designated location (e.g., home of user, work of user, or the like). In other examples, the organization may determine that at least one of the images were captured at a location associated with the organization (e.g., merchant location, branch office location, or the like). The locations at which the images were taken may be determined based on a location determination device, such as a GPS device, near field communication device, wireless location determination, Internet protocol address, geo-fencing device, or the like. When one or more of these location requirements are met the organization may have more confidence that the user 4 requesting authentication is actually the user 4.

In other examples, in addition to, or in place of, the time and location requirements, the organization may determine that the verification identification image and the liveness identification image were each taken by the user's mobile device by comparing a known mobile device identifier for the user 4 with a mobile device identifier coupled to the images. The known mobile device identifier may be stored with the organization, stored with a third-party, such as the mobile device carrier, or the like. The mobile device identifier may be the mobile phone number, a mobile device identification number (e.g., serial number, or the like), or the like that the organization may use to identify that the mobile device used to capture the images is in fact the mobile device of the user 4.

As illustrated in block 214 of FIG. 3 the organization further identifies user information from the verified identification image and/or liveness identification image, as previously discussed generally with respect to block 150 of FIG. 2. In some embodiments, the organization determines the name of the user, the address of the user, the age of the user, an identification number, the expiration or issue date for the verified identification, a facial scan of the image of the user in the verified identification, or the like user information from the verification identification image. Additionally, the organization may determine a facial scan form the liveness identification. In addition, an identifier, such as a voice scan, a keyword, a gesture movement, an object (e.g., picture, animal, figure, or the like), or the like may be identified from the liveness verification image (as well as from the verified identification image in some embodiments).

Block 216 of FIG. 3 illustrates that the organization determines if the user information and/or the identifier meets the authentication requirements. For example, the organization application determines if the user 4 in the verification identification image (e.g., user name, address, or the like) is the same as the user requesting authentication (e.g., same name, same address, as provided in an application, through a login, through user profile information, or the like). The organization may also determine if the verified identification is the correct type (e.g., valid governmental identification), is not expired, the user meets age requirements, or the like. In other examples, the organization application determines if the liveness identification image shows the user active (e.g., alive, movement in the video, or the like), the user makes gesture movements that correspond with authentication requirements (e.g., holds up a number of fingers, makes arm, leg, or other body movement, or the like), says characters, keywords, or phrases, includes a particular object in the image (e.g., house, office, product, or the like), and the organization determines if these meet the authentication requirements. For example, the organization may have randomly selected an identifier for the user or an identifier was previously agreed upon, such as a word, keyword, statement, gesture for the authentication requirement, and the organization may analyze the liveness identification image (e.g., video) in order to determine if the user has meet the authentication requirement by including the identifier in the liveness identification image.

Block 218 of FIG. 3 further indicates that the user information and/or identifier from the verified identification image and the liveness identification image may be compared. For example, each image may not only be required to include the verified identification and the liveness identification, but each image may be required to include a keyword, date, number, or any other type of characters that must match in order to confirm that the both images were taken by the user and/or at the same time. Additionally, or alternatively, the liveness identification, such as a video, may require the user to vocally recite one or more identifiers (e.g., characters, keywords, or the like) received from the organization application 17 or from the image of the verification identification (e.g., added characters included in the verified identification image when the image is captured by the user 4) in order to provide further security for user authentication. In some embodiments, a facial recognition comparison may be made between a photo of the user in the verification identification image and the user's face in the liveness identification image in order to provide additional security for the authentication determination made by the organization.

FIG. 3 illustrates in block 220 that based on blocks 208 through 218, the organization authenticates the user 4. Block 222 of FIG. 3 further illustrates that the authentication of the user 4 may only be allowed for a certain period of time, for example, for an authentication time period. In this way, the authentication of the user 4 to take an action may be limited in order to improve security for the action. As such, if the user 4 tries to take the action outside of the authentication time period, then the organization may deny the action.

Additionally as illustrated by block 224, once the user has been authenticated, then the organization may store the verified identification image and/or the liveness identification image, or portions thereof, in order to more quickly authenticate the user 4 in the future. For example, an identifier from a video (e.g., gesture, movement, keyword, object, or the like) may be stored by the organization application for future use. Block 226 of FIG. 3 further illustrates that when the organization receives additional requests from the user 4 that require authentication, the user 4 may provide a new liveness identification image (e.g., a new video of the user) and the organization may analyze the new liveness identification image to authenticate the user 4. For example, in lieu of other authentication methods described herein, the organization can authenticate the user 4 by determining if an identifier in the new liveness identification image matches the stored identifier from a previous liveness identification image (e.g., an original liveness identification image, substitute liveness identification image, or the like). Alternatively, an identifier from a new liveness identifier may be utilized as additional security when compared to a stored identifier from a previous identifier. As such, in addition to the other authentication methods described herein, the comparison of one or more new identifiers may be made with one or more stored identifiers for another layer of added security.

Figure 4:
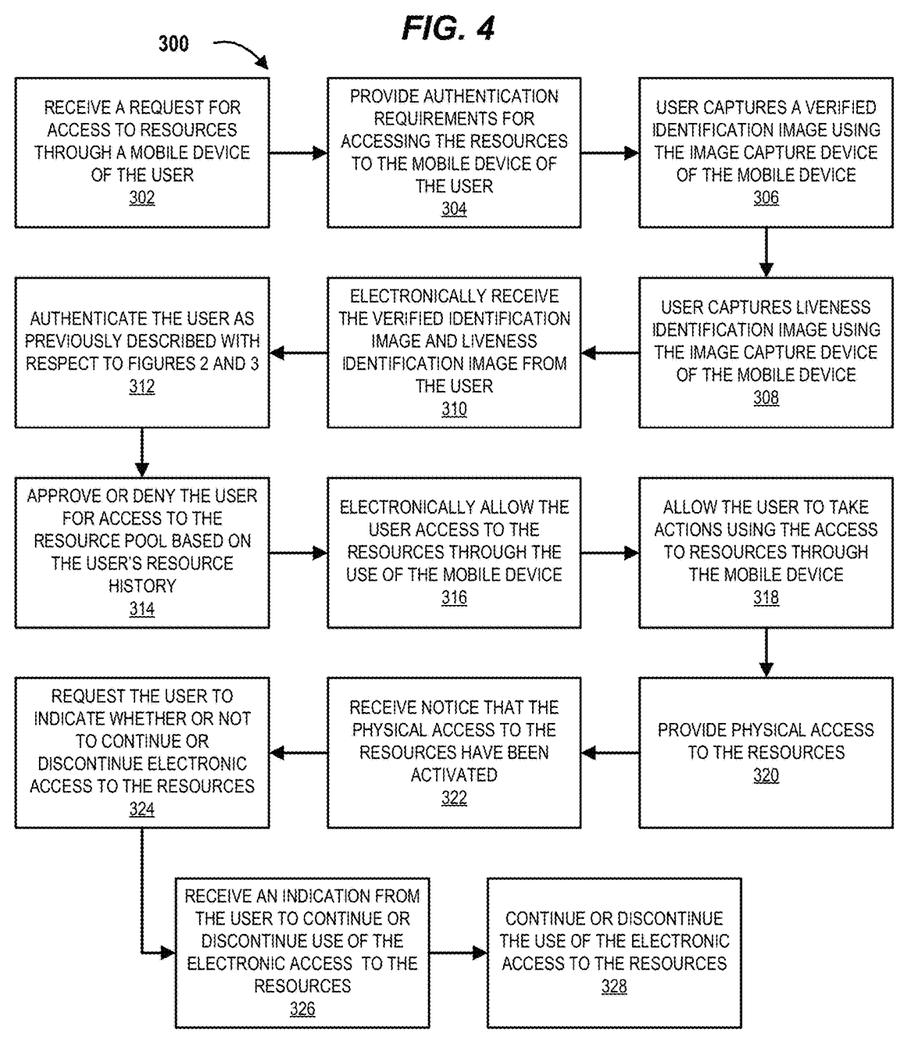
FIG. 4 illustrates a process flow for authenticating a user based on two images captured by the user's mobile device in order to allow a user to enter into an interaction through the mobile device, in accordance with embodiments of the invention.

FIG. 4 illustrates a process flow for authenticating a user based on two factors captured by the user's mobile device in order to allow a user to access resources through the mobile device and/or through another user computer system 20. In some embodiments the access to resources may include applying for access to a resource pool (e.g., applying for an account, such as a credit card, debit card, or other like account). As such, as illustrated by block 302, the organization receives a request from a user 4 to access resources. The request may include a request to open a new resource pool, and the request may be made through the user's mobile phone (e.g., user computer system 20).

Block 304 illustrates in FIG. 4 that the organization provides the requirements for accessing the resource pools to the user 4 on the user's mobile device. For example, the organization may provide an application for the user 4 to fill out in order to apply for access to the resource pool. In addition to the application, as previously discussed with respect to respect to block 204 in FIG. 3 and block 120 in FIG. 2, the organization may require the user to provide a verified identification and a liveness identification. Additionally, the organization may require the user to meet the other authentication requirements discussed herein.

FIG. 4 further illustrates in blocks 306 and 308 that the user captures a verified identification image and liveness identification image using the image capture device of the mobile device, as previously described with respect to block 206 in FIG. 3 and blocks 130 and 140 of FIG. 1. Moreover, as illustrated by block 310 in FIG. 4, the organization receives the application for access to the resource pool, including the images of the verified identification and the liveness identification, as previously described with respect to block 208 in FIG. 3 and blocks 130 and 140 in FIG. 1. In response, the organization authenticates the user 4 based on the application, the images, one or more identifiers, the electronic captured image data, user information, and/or a comparison of the user information with the authentication requirements and each other, as previously described with respect to FIGS. 2 and 3.

Block 314 of FIG. 4 further illustrates that after the user 4 is authenticated by the organization, a decision is made whether or not the user 4 qualifies for the resource pool, and if the user qualifies, for what does the user qualify. For example, after it is determined that the user 4 is who the user 4 says he/she is, then the user's resource history (e.g., financial history, transaction history, or the like) may be analyzed in order to determine if the user 4 qualifies for access to resources, and if so, for what does the user 4 qualify. For example, the user 4 may be approved for a credit card and/or debit card, and resource pool limits may be determined for the user 4, such as a resource pool maximum limit, resource pool rate, resource pool benefits, or the like.

FIG. 4 further illustrates in block 316, that once the user 4 is approved for access to the resource pool the user 4 may be granted access to the resource pool using the user's mobile device. For example, a resource pool number (e.g., actual account number, token, or the like) may be transferred from the organization (for from a third-party) to the user 4, such as through the organization systems 10 to the mobile device of the user 4. The resource pool number may be coupled with a digital wallet of the user 4 located on the user's mobile device. The user 4 may immediately begin to utilize the resource pool number through the use of the user's mobile device. In some instances just the resource pool number, and other identifying information is provided to the user's mobile device (e.g., issue date, expiration date, CVC code, or the like). However, in some embodiments, a virtual card may be presented to the user 4, such as an image of the front and back of a physical card that will be later presented to the user 4. In this way, the user 4 is able to apply for access to a resource pool in real-time, on-site, when needed by the user 4. For example, the user 4 may be at a store and may want to make a purchase at a store. However, the user 4 may not have access to resources (e.g., does not have cards), may want to use a particular resource pool for a particular benefit (e.g., a discount, rewards, or the like). As such, the present invention allows the user 4 to apply for and receive access to the resource pool, and immediately use the resource pool before receiving physical access to the resource pool (e.g., user may enter transactions with the card for "non-present card" purchases). Moreover, the present invention allows the organization to authenticate the user 4 with more confidence, more security, and more information for future authentication.

As illustrated by block 318, the user 4 may take actions (e.g., purchases, resource transfers, or the like) using the resources through the use of the digital wallet on the mobile phone immediately after being approved and verified, and without access to the physical card.

Block 320 of FIG. 4 illustrates that after approving the user 4 for access to the resource pool, the organization may provide physical access to the resource pool. For example, the user 4 may receive a card (e.g., debit card, credit card, or the like). As illustrated by block 322 of FIG. 4, the organization receives a notice that user 4 has received physical access to the resource pool. For example, the user 4 may receive a card in the mail, and the user 4 may activate the card through the Internet, through the phone, or the like. The organization receives notice that the user 4 has activated the physical card. Block 324 illustrates that the organization may send a request to the user 4 to indicate whether or not to continue or discontinue electronic access to the resource pool. The request may occur as the user 4 actives the physical access to the resource pool, or at a later point in time. For example, the organization may send the request to the user's mobile phone (e.g., call, text, pop-up, or other like notification), or the organization may prompt the user 4 the next time the user accesses the organization and/or the resource pool through the user's digital wallet on the mobile device. Block 326 illustrates that the user 4 may provide an indication that the user 4 would like to continue or discontinue electronic access to the resource pool (e.g., continue or discontinue use of an account number associated with the resource pool that is stored on the user's mobile device). In response to the user request, the organization or the user 4 may access the digital wallet on the user's mobile devices to remove reference to the resource pool on the user's mobile device or continue to allow access to the resource pool through the use of the user's mobile device.

The systems, methods, and computer program products described herein allow a user 4 to apply for and access resources in real-time without having to wait for physical access to the resources. That is, the user can apply for and be allowed access to a credit account in real-time through the user's mobile device and immediately enter into transactions without access to the card. The organization can access the user's mobile device (e.g., with the permission of the user) in order to add or remove access to the resource pool in the digital wallet on the user's mobile device. Moreover, it allows the organization or third-party providing the access to the resources to be more confident that the user 4 is who the user 4 is claiming to be based on the two factor authentication process that requires a verified identification image and a liveness identification image in order to authenticate the user 4. Moreover, an identifier in the liveness identification image allows the user and organization to authentic the user 4 on an ongoing basis for future actions by using the same or similar identifiers in new liveness identification images.

It should be understood that the interactions described herein are described with respect to a user and an organization. It should be understood that these interactions may occur through a user application 27 on the user computer system 20 communicating with the organization application 17 on the organization application 10. However, it should be further understood that when discussing these communications, the references to the organization and user 4 could be substituted with the applications and systems associated with the user 4 and organization. For example, references to the user 4, user application 27, and/or user systems 20 may be substituted for each other, and references to the organization, organization application 17, and/or organization systems 10 may be substituted for each other, in both instances in order to describe how the interactions are actually taking place. Moreover, it should be further understood that either in place of the user 4 or organization, or in addition to the user 4 or organization, the third-party, third-party application 37, and/or third-party systems 30 may replace the user 4 or organization, or may be located between the user 4 or organization, in order to facilitate the interactions described herein. For example, the third-party may be an intermediary between the user and/or organization, or the third-party may be taking an action for the user and/or organization, and thus, may be the entity that is entering into the interaction on behalf of the user 4 or organization.

It should be understood that while it has been described herein that the verified identification image is a photo, it should also be understood that the image of the verified identification may also be a video, live photo, or other like image. Moreover, the while it has been described herein that the verified identification image and the liveness identification image are separate images, it should be understood that in other embodiments of the invention they may be part of the same image. For example, the image may be a photo with a portion including the verified identification and a portion including user's face as the liveness identification. In another example, the image may be a video that shows the verified identification as well as the user, and potentially an identifier. As such, the systems and methods described herein related to using a separate verified identification image and liveness identification image may be replaced with a single image illustrating both the verified identification and the liveness identification.

It has been described herein that the user computer system 20 (i.e., the mobile device, or the like) is utilized to initiate the request that results in authentication, to capture the verified identification image and/or to capture the liveness identification image. However, it should be understood that the instead of, or in combination with, the user 4 making the request for authentication, capturing the verified identification image and/or capturing the liveness identification image through the use of the user computer system 20, the user 4 may make the request or capture one or more of the images (e.g., photo, video, or the like) using another channel. For example, the channel may be any type of user facing computer system (e.g., which has the same components as the organization systems 10, user computer systems 20, and/or third-party systems 30), such as an automated teller machine (ATM), a kiosk, a teller station (e.g., live or automated station), a merchant point-of-sale system (POS), a merchant system, or the like. As such, in some embodiments, the user 4 may make a request for authentication (e.g., request to access resources) at a user facing computer system (e.g., at an ATM), and either capture the images (e.g., verified identification image and/or liveness identification image) using the user facing computer system (e.g., ATM) or using the user computer device (e.g., mobile device). Therefore, the user 4 may capture the images using an image capture component in the user facing computer system (e.g., ATM) or using the user's mobile device as previously described herein. It should be understood that the references to the user computer system 20 and/or mobile device of the user 4 described herein may be replaced by the user facing computer system, such that the user facing computer system may be used instead of, or along with, the user computer system 20 to make the request resulting in the authentication and/or to capture the images described herein. Making the request resulting in authentication at the user facing computer system (e.g., ATM, kiosk, or the like) may provide an additional level of authentication (e.g., additional authentication factor), because it may require the user 4 to provide an account number and/or pin number to make the initial request.

It should be further understood, that when making the initial request that results in the authentication of the user 4 as described throughout this disclosure, the user 4 may utilize the mobile device to sign into the user's online account, such that the user provides an initial authentication (e.g., using a login and/or password), and capturing the verified identification image and/or liveness identification image provides a second and third factor of authentication.

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively monitoring the resource usage and availability. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously monitoring the real-time data feeds from the various systems, the systems may be configured to update activities associated with the systems, as described herein.

Moreover, it should be understood that the process flows described herein include transforming the data from the different systems (e.g., internally or externally) from the data format of the various systems to a data format associated with the reports for display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. Patent Application Ser. No. | Title | Filed On |
| --- | --- | --- | --- |
| 7777US1.014033.3012 | 15/598,074 | SYSTEM FOR ELECTRONIC AUTHENTICATION WITH LIVE USER DETERMINATION | Concurrently herewith |
| 7778US1.014033.3008 | 15/597,481 | SYSTEM FOR ELECTRONIC AUTHENTICATION WITH BOT DETECTION AND DENIAL | Concurrently herewith |
| 7780US1.014033.3014 | 15/597,782 | SYSTEM FOR ALLOWING SECURE ACCESS AND USE OF A VIRTUAL CREDENTIAL | Concurrently herewith |

What is claimed is:

1. A system for authentication using a live user determination, the system comprising:

one or more memory devices having computer readable code stored thereon; and one or more processing devices operatively coupled to the one or more memory devices, wherein the one or more processing devices are configured to execute the computer readable code to:

receive a request from a user through a user application to access an organization application to take an action, wherein the user application is located on a mobile device of the user and the request is received from the mobile device;

receive a verified identification image, wherein the verified identification image is captured by the user through the mobile device and received from the mobile device, and wherein the verified identification image includes one or more characters added to the verified identification image;

receive a liveness identification image, wherein the liveness identification image is a video of the user, and wherein the liveness identification image is captured by the user through the mobile device and received from the mobile device, and wherein the video comprises a recitation of the one or more characters added to the verificated identification image; and determine that the user is authenticated for the action based on the action, the verified identification image, the liveness identification image, and the one or more characters included in the verification identification image and recited in the video.

2. The system of claim 1, wherein the verified identification image is an image of a government issued identification that verifies an identity of the user, and the video of the user verifies that the user is active.

3. The system of claim 2, wherein determining that the user is authenticated comprises:

capturing first user information from the verified identification image, wherein the first user information comprises at least a name of the user from the government issued identification and an indication of an identifier; and capturing the identifier from the liveness identification image, wherein the identifier comprises a movement of the user indicating that the user is active, an object in the video other than the user, or facial recognition information.

4. The system of claim 2, wherein determining that the user is authenticated comprises:

capturing first user information from the verified identification image;

capturing second user information from the liveness identification image;

wherein the first user information and the second user information are images of the user's face; and comparing the first user information and the second user information for the authentication of the user.

5. The system of claim 2, wherein determining the authentication of the user comprises:

identifying electronic capture data from the verified identification image and from the liveness identification image, wherein the electronic capture data is captured by the user using the mobile device, and wherein the electronic capture data is coupled to the verification identification image and the liveness identification image; and comparing the electronic capture data of the verified identification image and the liveness identification image with authentication requirements.

6. The system of claim 5, wherein the electronic capture data comprises a time when the verified identification image and the liveness identification image were captured by the mobile device, wherein the authentication requirements include a required time period, and wherein the authentication requirements are met when the verified identification image and the liveness identification image are both captured at the time that falls within the required time period.

7. The system of claim 5, wherein the electronic capture data comprises a location where the verified identification image and the liveness identification image were captured using a location determining device of the mobile device, wherein the authentication requirements include a required location, and wherein the authentication requirements are met when the location where the verified identification image or the liveness identification image were captured meet the required location.

8. The system of claim 2, wherein after determining the authentication of the user the one or more processing devices are further configured to execute the computer readable code to:

receive an indication from the user of an authentication identifier in the video that may be used for future authentication;

store the authentication identifier for the user for the future authentication;

receive a request from the user for a second action;

receive a second video from the user;

determine a current identifier of the user from the second video;

determine a second authentication of the user based on the current identifier matching the authentication identifier.

9. The system of claim 8, wherein the authentication identifier and the current identifier comprise a movement of the user in the video and the second video.

10. The system of claim 1, wherein the action is a request to open a resource pool to access resources, wherein the request includes user information regarding the request, and wherein the resource pool is an account and the resources are funds associated with the account.

11. The system of claim 10, wherein the one or more processing devices are further configured to execute the computer readable code to:

allow virtual access to the resources through the mobile device when the authentication of the user and the request for access to the resource pool are approved;

allow the user to utilize the resources through the mobile device while the user waits for physical access to the resources.

12. The system of claim 11, wherein the one or more processing devices are further configured to execute the computer readable code to:

receive an indication that that the user has the physical access to the resources in the resource pool;

allow the user to retain the virtual access to the resources in the resource pool through the mobile device when an indication that the user wants to retain the virtual access to the resources in the resource pool is received from the user through the mobile device; and remove reference to the resources from the mobile device of the user when an indication that the user wants to remove the virtual access to the resources in the resource pool is received from the user through the mobile device.

13. The system of claim 11, wherein the virtual access is provided through the use of a virtual card.

14. The system of claim 11, wherein the physical access is provided through the use of a physical card.

15. A computer implemented method for authentication using a live user determination, the method comprising:

receiving, by one or more processors, a request from a user through a user application to access an organization application to take an action, wherein the user application is located on a mobile device of the user and the request is received from the mobile device;

receiving, by the one or more processors, a verified identification image, wherein the verified identification image is captured by the user through the mobile device and received from the mobile device, and wherein the verified identification image includes one or more characters added to the verified identification image;

receiving, by the one or more processors, a liveness identification image, wherein the liveness identification image is a video of the user, and wherein the liveness identification image is captured by the user through the mobile device and received from the mobile device, and wherein the video comprises a recitation of the one or more characters added to the verified identification image; and determining, by the one or more processors, that the user is authenticated for the action based on the action, the verified identification image, the liveness identification image and the one or more characters included in the verification identification image and recited in the video.

16. The method of claim 15, wherein the verified identification image is an image of a government issued identification that verifies an identity of the user, and the video of the user verifies that the user is active.

17. The method of claim 16, wherein determining that the user is authenticated comprises:

capturing first user information from the verified identification image, wherein the first user information comprises at least a name of the user from the government issued identification and an indication of an identifier; and capturing second user information from the liveness identification image, wherein the second user information comprises the identifier comprising a movement of the user indicating that the user is active, an object in the video other than the user, or facial recognition information.

18. The method of claim 16, wherein the action is a request to open a resource pool to access resources, wherein the request includes user information regarding the request, wherein the resource pool is an account and the resources are funds associated with the account, and wherein the one or more processors are further configured to execute the computer readable code to:

allow virtual access to the resources through the mobile device when the authentication of the user and the request for access to the resource pool are approved;

allow the user to utilize the resources through the mobile device while the user waits for physical access to the resources.

19. A computer program product for authentication using a live user determination, the computer program product comprising at least one non-transitory computer-readable medium having computer-readable program code portions embodied therein, the computer-readable program code portions comprising:

an executable portion configured to receive a request from a user through a user application to access an organization application to take an action, wherein the user application is located on a mobile device of the user and the request is received from the mobile device;

an executable portion configured to receive a verified identification image, wherein the verified identification image is captured by the user through the mobile device and received from the mobile device, and wherein the verified identification image includes one or more characters added to the verified identification image;

an executable portion configured to receive a liveness identification image, wherein the liveness identification image is a video of the user, and wherein the liveness identification image is captured by the user through the mobile device and received from the mobile device, and wherein the video comprises a recitation of the one or more characters added to the verified identification image; and an executable portion configured to determine that the user is authenticated for the action based on the action, the verified identification image, the liveness identification image, and the one or more characters included in the verification identification image and recited in the video.

20. The computer program product of claim 19, wherein the verified identification image is an image of a government issued identification that verifies an identity of the user, and the video of the user verifies that the user is active.

* * * * *